(12) United States Patent
Doddamane et al.

(10) Patent No.: US 7,346,003 B2
(45) Date of Patent: Mar. 18, 2008

(54) METHOD OF INCREASING NOISE IMMUNITY WITH A SIMULATED PREAMBLE

(75) Inventors: Krishna Doddamane, Dallas, TX (US); John C. Greene, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 731 days.

(21) Appl. No.: 10/884,428

(22) Filed: Jul. 2, 2004

(65) Prior Publication Data

US 2006/0002429 A1    Jan. 5, 2006

(51) Int. Cl.
*H04J 15/00* (2006.01)
(52) U.S. Cl. ............................... 370/241; 375/340
(58) Field of Classification Search ................. 370/241
See application file for complete search history.

(56) References Cited

U.S. PATENT DOCUMENTS

| | | | | |
|---|---|---|---|---|
| 4,466,108 A | * | 8/1984 | Rhodes ........................ 375/329 |
| 5,053,774 A | * | 10/1991 | Schuermann et al. .... 340/10.34 |
| 5,297,172 A | * | 3/1994 | Shenoy et al. ............... 375/371 |
| 5,347,280 A | * | 9/1994 | Schuermann ................. 342/42 |
| 5,359,585 A | * | 10/1994 | Tanoue et al. ........... 369/47.35 |
| 6,016,329 A | * | 1/2000 | Iwasaki ....................... 375/340 |
| 2002/0034265 A1 | * | 3/2002 | Legrand et al. ............. 375/316 |

OTHER PUBLICATIONS

Presentation entitled Keeping Pace With RFID presented by Lowry Computer Products.
Manual entitled TI-RFID Product Manuals dated Nov. 2001.
Paper entitled The Cutting Edge of RFID Technology and Applications for Manufacturing and Distribution by Susy d'Hont of Texas Instruments TIRIS.

* cited by examiner

*Primary Examiner*—Kwang Bin Yao
*Assistant Examiner*—Andrew Lai
(74) *Attorney, Agent, or Firm*—William B Kempler; W. James Brady, III; Frederick J. Telecky, Jr.

(57) ABSTRACT

Circuitry and method for receiving and decoding a data stream without a preamble transmitted from the transmitting device. The invention includes circuitry in the receiver or interrogation unit for generating a simulated preamble signal that is provided to the input of an averaging circuit and a comparator. The averaging circuitry then averages the simulated preamble signal and the actual received data signal to avoid loss of messages and information data at the front end of the received signal from a transponder.

17 Claims, 2 Drawing Sheets

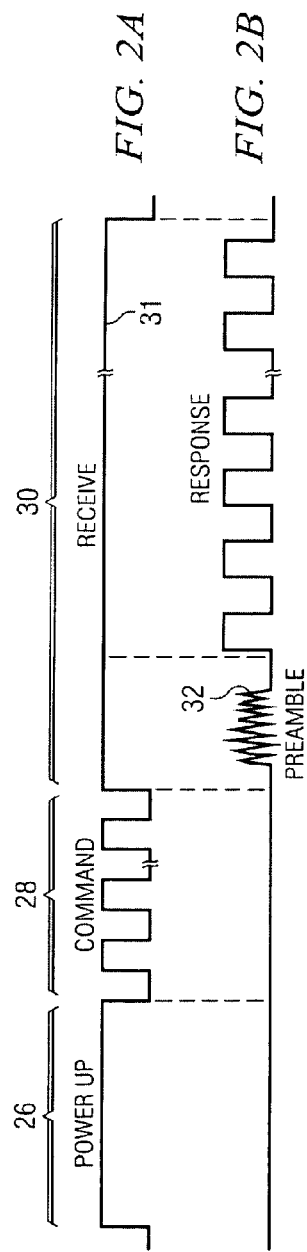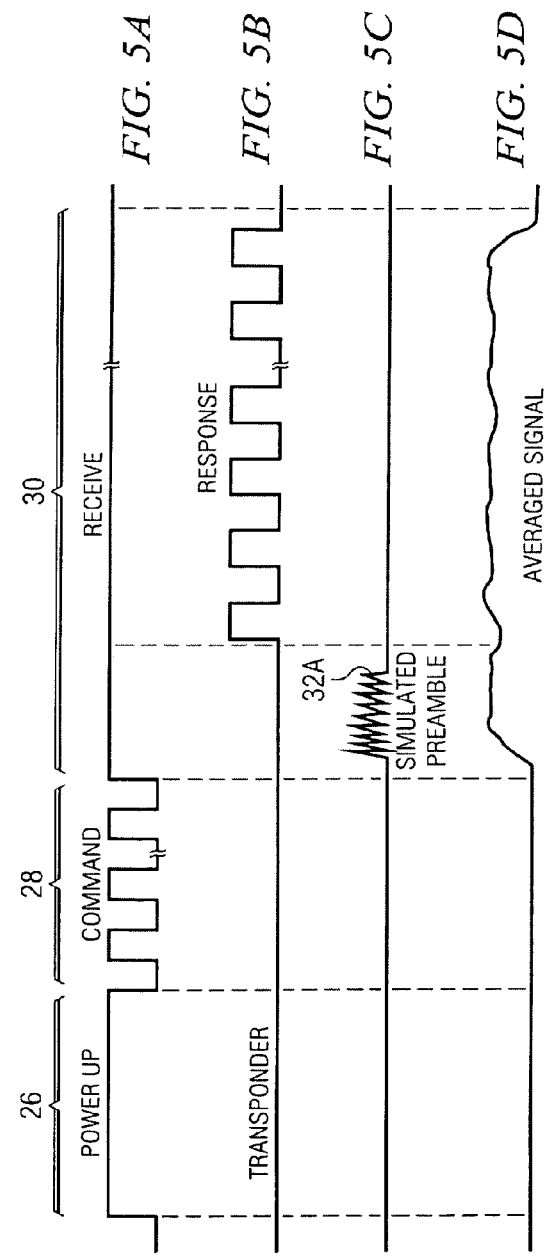

METHOD OF INCREASING NOISE IMMUNITY WITH A SIMULATED PREAMBLE

TECHNICAL FIELD

The present invention relates generally to the field of Radio Frequency IDentification (RFID) such as, for example, a transponder arrangement comprising an interrogation unit, which transmits an RF interrogation pulse to at least one transponder. The transponder then returns stored data back to the interrogation unit in the form of a modulated RF carrier. The data carried by the RF carrier may be coded in a Manchester-coded format. The interrogation unit may then operate to transmit control data to the transponder unit, which then initiates an action dependent upon the received data. Alternately, the interrogation unit may simply monitor and collect the data for purposes of record keeping or reporting.

More specifically, the invention relates to the recovery and prompt and effective decoding of a data stream without requiring the transmission of a preamble or preliminary setup data stream.

BACKGROUND

There is a need for devices or apparatus, which make it possible to identify or detect items or objects in a contactless manner. Such devices or apparatus may be manufactured integral with or attached to the object being identified. It is also important that such devices operate effectively and accurately within a selected distance from an interrogation unit and that the device be inexpensive.

More specifically, it is, for example, desirable to receive the unique identification, which is assigned to an object and which is stored in the device or apparatus in a contactless manner and over a specified distance. A determination may also be made as to whether or not a particular object exists within a given reading range. Still other embodiments may provide information concerning physical parameters, such as a temperature or a pressure related to the monitored item in addition to providing a unique identification when direct access to the object is not possible.

According to other uses, a device or apparatus can, for example, be attached to an animal, which can then always be identified at an interrogation point, a threshold or feed location without direct contact. There is also a need for such a device, which when carried by a person, permits access checking, such that only persons whose transponder units return certain identification data to the interrogation unit are allowed access to a specified area. In this case, the safeguarding of the data transfer, such as by encryption, may be a very essential factor in the production of such devices. Still another example in which such a device is needed is the computer-controlled industrial production in which, without the intervention of operating personnel, components may be taken from a store, transported to a production location and there assembled to give a finished product. In this case, a device is required, which can be attached to the individual components so that the components can be specifically detected in the storage location and such that removal is monitored and recorded. Typically, most of the parameters of coded data transmitted to an interrogation unit have been previously determined such that the interrogation unit has been adjusted and the received signal is a sufficiently robust signal that it can be clearly identified from noise and spurious signals having a frequency within the frequency bandwidth of the transmitted data. However, as was mentioned above, if such RFID devices are to be used extensively, they are preferably inexpensive to manufacture and may be substantially disposable one-use devices. Therefore, to keep costs low many of these inexpensive transponder devices do not use a battery or other active power source, but instead may simply comprise a capacitor that collects and stores RF energy transmitted from the interrogation unit. This stored energy is then used for providing the identifying data transmission. Even if the device does include a small active power source, the power source may also be needed for data collection and data processing by the RFID device. Therefore, the power level of the transmitted data may be very low. In addition, if typical preliminary setup data bits or the "preamble" are eliminated, both the power usage and the time to complete an interrogation cycle are reduced. Unfortunately, simply eliminating the preamble renders the transmission susceptible to noise such that a transmitted message may be lost or received inaccurately.

Therefore, it would be advantageous to provide an effective technique for the interrogation unit to receive the transmitted data stream and accurately decode the data without the transmission of a preamble or preliminary setup and/or calibration data bits.

SUMMARY OF THE INVENTION

These and other problems are generally solved or circumvented, and technical advantages are generally achieved, by preferred embodiments of the present invention which provides methods and apparatus for receiving and decoding a stream of data bits without also requiring that a preamble be transmitted from the transmitting device or transponder.

More specifically, an interrogation unit transmits a power-up signal that is received by a transponder such as an RFID device. Subsequent to the power-up signal and a connect signal, the interrogation unit provides a constant power transmission signal for use by the RFID device. Thus, energy from the interrogation unit is typically collected and stored by the transponder and used to provide requested information. The interrogation unit then generates one or more internal or simulated preamble signals prior to the transmission of data from the RFID device rather than requiring the transponder to transmit an actual preamble signal. The simulated preamble mimics a preamble signal that is typically generated and transmitted by the transponder to the interrogation unit. The transponder then transmits a data steam, such as for example a Manchester-coded data signal, without a preamble. The internally generated preamble signal is provided to the appropriate circuitry of the interrogation unit along with the received data stream received from the transponder. The internally generated preamble is averaged with the received data stream to determine an averaged signal. This averaged signal is then provided to a comparator along with the real-time received data signal to determine the voltage level of the comparator output. The use of an internally generated preamble provides an initial signal suitable for combining with the received data signal to provide an averaged signal to the comparator. Consequently, it is possible to obtain data signals suitable for decoding or otherwise processing without the transmitter being required to provide such a preamble signal.

According to a specific embodiment of the invention, the data stream is a Manchester-coded data stream having a frequency of between about 200 KHz and 1.2 MHz.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 2A and 2B illustrate the signal wave forms of a typical prior art power-up signal from the interrogation unit and the transmissions of a transponder;

FIGS. 5A, 5B, 5C and 5D illustrate the signal wave form of a prior art power-up and beginning bit transmission of a transponder and interrogation unit when the preamble is internally generated by the interrogation unit.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
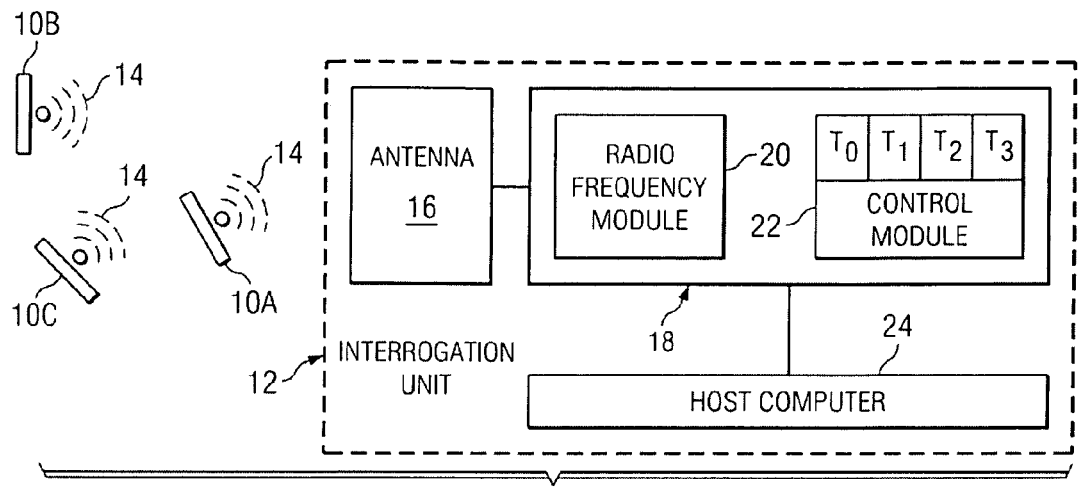
FIG. 1 is a block diagram of a typical arrangement of an RFID transponder device or unit and an interrogation unit.

Referring now to FIG. 1, there is shown a block diagram of a typical arrangement of three RFID transponders 10a, 10b and 10c and an interrogation unit 12. Each of the transponders 10a, 10b and 10c will typically have a unique identifier tag or code and may also include other information related to environmental conditions or performance characteristics of the responder itself or the item to which it is attached. Each of the transponders will generate RF (radio frequency) signals 14 that carry the unique identifier information and any other information collected or stored. In addition, each transponder will receive a start of power or power-up signal (not shown) from interrogation unit 12. The transponder may also receive one or more request signals that identify information that is to be transmitted to the interrogation unit 12. Manchester-coded RF signals have been found to be particularly useful in such devices.

The RF signals generated by the transponders are received by an antenna 16 at the interrogation unit 12. The raw encoded carrier signal is then provided to receiving circuitry 18 in the interrogation unit 12, which typically will include an RF module or portion 20 and a control module 22. The receiving circuitry 18 will then condition and/or process the received carrier signals to recover and convert the data stream to a desired format. As an example, the information decoded or processed from a Manchester-coded format and contained in the processed or RF signals is then provided to a host computer 24, which may be part of the interrogation unit 12 itself, as shown, or alternately, may be a separate computer that is linked to the interrogation unit when necessary to exchange data.

As discussed above, the use of Manchester-coded signals have been found to be particularly useful with RFID transponders. However, the present invention is applicable to substantially any type of a data bit stream that typically uses a "preamble" signal to condition the receiving circuitry with respect to various transmission parameters.

As was mentioned above, when the interrogation unit 12 needs information related to one of the transponders 10a, 10b or 10c that does not have its own battery or active power source, an RF "power-up" signal is transmitted that is received by the transponder and after a command signal, the interrogation unit then provides a continuous power signal for use by one or more transponders. The transponder then collects and stores RF energy from the power-up signal, and all subsequent signals, and uses this energy to provide an RF response to the interrogation unit. Referring now to FIGS. 2A and 2B, respectively, there is shown the wave format of the signal transmission from the interrogation unit 12 and from a transponder 10a, 10b or 10c. As shown in FIG. 2A, there is a power-up portion 26 of the interrogation unit transmitted RF signal. As mentioned, the power-up portion 26 provides power that may be collected and stored by the transponder for use to provide a response. The power-up portion 26 is followed by a command portion 28, which may simply identify which transponder is to respond or may provide a series of different and complex requests from one or more transponders. Command portion 28 may be of any needed length and may include a few short data bits or a long string of data bits. The command portion 28 is then followed by the information or response portion 30, which provides a continuous RF power signal for use by one or more of the transponders while at the same time receiving a stream of data bits from the appropriate transponder containing identifying information or previously requested information. FIG. 2B shows one typical transponder response according to the prior art. As shown, at some point after the command portion 28 of the interrogation unit transmitted signal, the appropriate transponder generates one ore more preamble signals 32 that prepares the receiving or interrogation unit for the proper signal levels and the like of one or more subsequent data streams. According to other prior art approaches, access may be provided to the threshold, time constraints and other electrical parameters of the analog front-end circuitry of the receiver or interrogation unit such that these parameters may be charged as needed to improve the performance of the receiver.

After the interrogation unit 12 receives a preamble signal 32, which allows the receiver to set the appropriate signal levels, etc., the transponder then transmits the appropriate data to the receiver as indicated in section 34.

According to other prior art techniques, the transponder simply does not transmit a preamble signal 32 at all. For example, some RFID tags, sometimes referred to as "tokens" or "proximity cards," do not include a preamble. However, lack of a preamble signal results in the receiver or interrogation unit being more susceptible to noise such that the transmitted information or message could be lost or received inaccurately.

Figure 3:
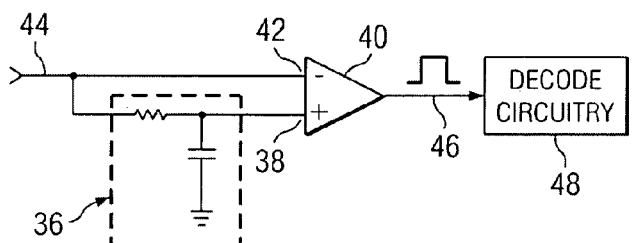
FIG. 3 is a block diagram of a combined signal comparator and an averaging circuit used by an interrogation unit.

Referring now to FIG. 3, there is shown a simple RC averaging circuit 36 that provides one input 38 to a comparator 40. The other input 42 of the comparator 40 is connected to input line 44 for receiving the actual data signals transmitted from the transponder and picked up by antenna. These signals may be in a coded format, such as for example a Manchester-coded format. The input of the averaging circuit 36 is also connected to input line 44 to receive the data signals from the transponder. Thus, input 42 of comparator 40 receives the transmitted data stream, which may be in a Manchester-coded format, from the transponder more or less in real time as the other input 38 receives an averaged data stream that represents the average signal strength over a selected period of time. Comparator 40 then compares the data signal and the averaged signal and provides a high or low level output signal at output 46, representative of the data stream, such as for example, a Manchester-coded data stream. The data stream is then provided to processing circuitry, such as decode circuitry 48, where coded information is extracted.

Therefore, according to the present invention, the interrogation unit includes circuitry for generating one or more simulated preamble signals that are sent to the antenna circuitry 16 and RF module 20 of the interrogation unit 12 to prime and prepare the receiving circuitry 18 of the interrogation unit 12 so that when the actual information data stream is received, the receiving circuitry can detect and accurately determine or decode the data.

Figure 4:
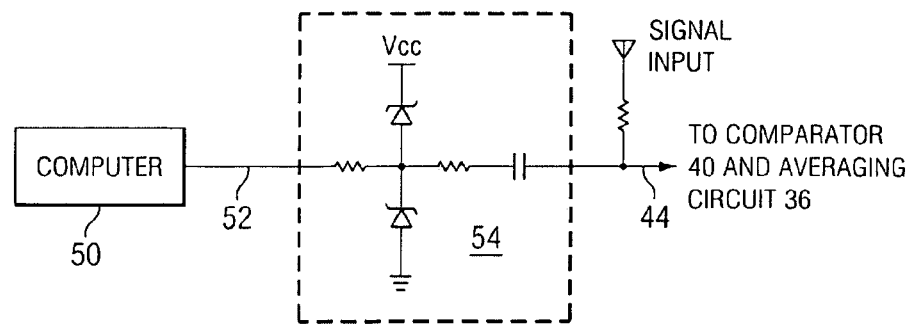
FIG. 4 illustrates circuitry for generating an internal preamble signal that is provided to the averaging circuit so that a transponder may transmit requested data with and first having to transmit a preamble signal.

Referring now to FIG. 4, there is shown circuitry for providing a simulated preamble signal. As shown, a control circuit 50, such as a computer, generates preamble signals on line 52, which have an appropriate frequency and amplitude. This signal on line 52 is provided to a clamping and filter circuit 54 that assures a signal having an excessive voltage level is not fed back into control circuitry 50. The output of the clamping and filter circuit is provided to the input line 44 of the averaging circuit discussed above with respect to FIG. 3. In addition, the actual input signals from the transponder as received at antenna 16 are also provided to input line 44.

Therefore, now referring to FIGS. 5A, 5B, 5C and 5D, there are illustrated the various signals and wave forms generated by the interrogation unit 12 and transponders according to the present invention. It will be appreciated that FIG. 5A is the same as FIG. 2A and FIG. 5B has some similarity to FIG. 2B. However, as shown in FIG. 5B, there is no preamble portion or signal 32 generated by the transponder. Instead, there is the simulated preamble signal 32a internally generated by the interrogation unit 12 as indicated in FIG. 5C. As shown, the simulated preamble signals 32a are generated by the interrogation unit after the command portion 28 of the interrogation signal and before the response portion of the transponder signal. That is, the simulated preamble signals 32a are generated by the interrogation unit 12 during the same time period they would be generated by a transponder in the prior art. Further, since the simulated preamble signals 32a are also provided to the averaging circuit 36 on input line 44, they create an averaged signal input to comparator 40. Thus, when a data stream arrives at input line 44, there is already a signal available at the comparator 40 for comparing with the real-time data signal received from the transponder. FIG. 5D illustrates the average strength of the signal applied to comparator 40. Thus, by using the teachings of the present invention, the receiver is not as susceptible to noise at the beginning of a transmitted data stream such that the data is not as likely to be lost or received inaccurately. Although particularly suitable for receiving coded data that does not include preamble signals, it will be appreciated that the circuitry of the invention will also operate satisfactorily to receive data signals that do include a preamble.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of receiving and processing a data stream without a preamble transmitted from a transmitting device in response to signals from an interrogation unit comprising the steps of:
    generated an internal simulated preamble signal by said interrogation unit subsequent to said signals;
    transmitting a data stream from said transmitting device;
    receiving said data stream at said interrogation unit;
    averaging said simulated preamble signal and said received data stream to determine an initial averaged signal; and
    providing said received data stream and said initial averaged signal as two inputs to a comparator.

2. The method of claim 1 further comprising comparing said two inputs to said comparator to determine the level of the comparator output signal.

3. The method of claim 2 and subsequent to said providing step, further comprising continuously receiving said data stream to continuously provide an updated averaged signal based on said received data stream.

4. The method of claim 3 and subsequent to said providing step, said method further comprising the step of continuously switching the output level of said comparator as a function of differences in said averaged signal and said received data stream.

5. The method of claim 1 wherein said step of transmitting a data stream comprises the step of transmitting a Manchester-coded data stream.

6. The method of claim 5 further comprising the step of decoding said coded data stream.

7. The method of claim 1 wherein said step of receiving a data stream comprises the step of receiving a data stream with a preamble.

8. The method of claim 6 wherein said step of receiving and decoding a data stream comprises the step of receiving and decoding a data stream with a preamble.

9. The method of claim 1 wherein the frequency of said data stream from said transmitting device is between about 200 KHz and about 1.2 MHz.

10. The method of claim 1 wherein said transmitting device is an RFID (Radio Frequency Identification Device).

11. Apparatus adapted for receiving and processing a data stream without a preamble transmitted from a transmitting device in response to a power-up signal transmitted from an interrogation unit comprising:
  circuitry for generating a simulated preamble signal subsequent to the initial transmission of said power-up signal;
  averaging circuitry having an input for receiving said simulated preamble signal and said received data stream and for providing an averaged signal as an output; and
  a comparator for comparing said data stream and said average signal and for switching between two voltage levels as a function of the difference between said received coded data stream and said averaged signal.

12. The apparatus of claim 10 wherein said received data stream is a Manchester-coded data stream.

13. The apparatus of claim 12 further comprising circuitry for receiving and decoding said comparator output.

14. The apparatus of claim 11 wherein said received data stream has a frequency of between about 200 KHz and about 1.2 MHz.

15. The apparatus of claim 13 wherein said received data stream has a frequency of between about 200 KHz and about 1.2 MHz.

16. The apparatus of claim 10 wherein said transmitting device is an RFID (Radio Frequency IDentification).

17. The apparatus of claim 11 wherein said apparatus can also receive and process a data stream with a preamble.

* * * * *